April 18, 1961  K. R. DOBSON  2,980,730
PRODUCTION OF ETHYL ACRYLATE
Filed Sept. 12, 1958
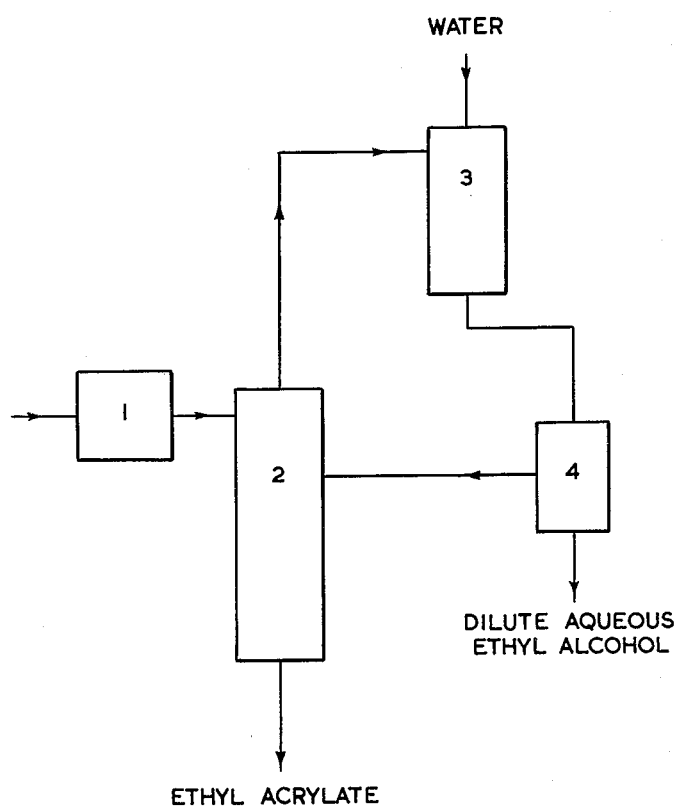
Inventor
Kenneth Rowland Dobson
by Albert Jacobs
Attorney : 2,980,730
Patented Apr. 18, 1961

2,980,730

PRODUCTION OF ETHYL ACRYLATE

Kenneth Rowland Dobson, Hull, England, assignor to The Distillers Company Limited, Edinburgh, Scotland, a British company Filed Sept. 12, 1958, Ser. No. 760,783

Claims priority, application Great Britain Sept. 20, 1957

2 Claims. (Cl. 260—486)

The present invention relates to the production of ethyl acrylate from ethyl 3-ethoxypropionate.

It is known that an acrylate may be prepared by introducing a 3-alkoxypropionic ester of an alkanol into a reactor containing an acidic dehydration catalyst and withdrawing the acrylate produced, together with the alkanol, by distillation. When it is attempted to use this procedure in the preparation of ethyl acrylate from ethyl 3-ethoxypropionate, a poor recovery of ethyl alcohol is obtained and a large proportion of by-products arise from dehydration of the alcohol; these by-products include diethyl ether and ethyl sulphates, and the production of ethyl sulphates causes a rapid loss of catalyst activity.

If water alone is added to the 3-ethoxypropionic ester before it is introduced into the reactor, in an attempt to suppress the formation of alcohol dehydration products, the recovery of the desired product is rendered difficult since a proportion of the 3-ethoxypropionic ester is hydrolysed to undesired organic acids.

It is an object of the present invention to provide an improved process for the conversion of ethyl 3-ethoxypropionate to ethyl acrylate.

Accordingly, the present invention is a process of producing ethyl acrylate which comprises heating a mixture consisting of ethyl 3-ethoxypropionate, ethyl alcohol and water in the presence of a dehydration catalyst and removing the ethyl acrylate produced in the form of volatile azeotropes with ethyl alcohol and with water.

The invention may be carried out by introducing the mixture of ethyl 3-ethoxypropionate, ethyl alcohol and water into a reactor maintained at an elevated temperature and containing a further quantity of the same mixture in admixture with a dehydration catalyst, and removing the ethyl acrylate produced in the form of volatile azeotropes with ethyl alcohol and with water. The rate at which the starting mixture of ethyl 3-ethoxypropionate, ethyl alcohol and water is added to the contents of the reactor is preferably arranged to be from about 25% to 100% of the volume of the initial reactor contents per hour.

Preferably, the mixture of ethyl 3-ethoxypropionate, ethyl alcohol and water used in the invention contains from 13% to 16% by weight of water based on the weight of ethyl 3-ethoxypropionate present in the mixture. The mixture of ethyl 3-ethoxypropionate, ethyl alcohol and water may, for instance, contain from 72% to 75% by weight of ethyl 3-ethoxypropionate and from 14% to 17% by weight of ethyl alcohol.

The heating of the mixture of ethyl 3-ethoxypropionate, ethyl alcohol and water in the presence of the dehydration catalyst may be carried out in an inert atmosphere; a stream of nitrogen may, for instance, be passed through a reactor in which the heating takes place. A substance inhibiting the polymerisation of ethyl acrylate, such as benzoquinone, sodium nitrite, nitric oxide, hydroquinone or p-tertiary butyl catechol, may also be present in the reactor.

The mixture of ethyl 3-ethoxypropionate, ethyl alcohol and water is preferably heated in the presence of the dehydration catalyst at a temperature from 100° to 200° C. The heating is conveniently effected at substantially atmospheric pressure, although a superatmosphere pressure may be used if desired.

Conveniently, the mixture of ethyl 3-ethoxypropionate ethyl alcohol and water is introduced into a reactor connected to a fractionating column fitted with a reflux head. The reactor temperature and pressure are preferably adjusted so as to allow the azeotropes of ethyl acrylate with ethyl alcohol and with water to be returned as reflux; when the conditions in the column have reached a steady state, a proportion of the azeotropes may be removed. The volatile azeotropes of ethyl acrylate with ethyl alcohol and with water are produced having boiling points in the range from 77° to 81° C. at atmospheric pressure.

The invention may be carried out in a batchwise manner; conveniently, however, it is carried out in a continuous manner so that ethyl alcohol is also recovered from the volatile azeotrope of ethyl acrylate with ethyl alcohol and a part of this recovered alcohol is returned to the reactor in the mixture of ethyl 3-ethoxypropionate, ethyl alcohol and water.

The dehydration catalyst may be a strong inorganic acid, suitably sulphuric acid or phosphoric acid; a strong organic acid, such as p-toluene sulphonic acid or an acid ester of a strong inorganic or organic acid may also be used. Preferably at least 2% by weight of the catalyst is present in the mixture based on the weight of the mixture of ethyl 3-ethoxypropionate, ethyl alcohol and water.

The ethyl acrylate and ethyl alcohol are preferably recovered from the azeotropes of ethyl acrylate with ethyl alcohol and with water by passing the azeotropes into a column containing a benzene head zone so as to separate ethyl acrylate and a ternary azeotrope of benzene, water and ethyl alcohol; the ternary azeotrope is then washed with water and aqueous ethyl alcohol and benzene are separated and recovered.

In the apparatus shown diagrammatically in the accompanying figure, which illustrates one embodiment of the present invention, a mixture consisting of ethyl 3-ethoxypropionate, ethyl alcohol and water is passed into a reactor 1 containing a further quantity of the mixture in admixture with about 10% by weight of the dehydration catalyst. The volatile azeotropes of ethyl acrylate with ethyl alcohol and with water produced are removed from the reactor 1 and are passed into the fractionating column 2 maintained at an elevated temperature and having benzene vapour present in a zone near the head of the column. Ethyl acrylate is separated from the base of the column 2 and may then be purified, for example by re-distillation. A benzene: water: ethyl alcohol ternary azeotrope, together with a small proportion of a benzene: ethyl alcohol binary azeotrope, passes from the head of the column and enters a cooled packed washing column 3, where it encounters a stream of water and is thus condensed and washed. The stream of water may be arranged to run concurrently or countercurrently with the ternary azeotrope. The effluent from the washing column 3 passes to a decanter, 4, in which two layers separate. The benzene in the upper layer may be recycled to the column 2. The lower layer consists of dilute aqueous ethyl alcohol together with a small quantity of benzene and ethyl acrylate; the ethyl alcohol is preferably recovered from the aqueous layer by distillation and part of it may then be recycled to the reactor 1 as part of the feed mixture of ethyl 3-ethoxypropionate, ethyl alcohol and water; the small proportions of ethyl acrylate and benzene are also preferably recovered.

Some polymerisation of the ethyl acrylate may occur while the process of the invention takes place and this may be inhibited by having a small quantity of benzoquinone present in the column 2. Polymerisation may also be inhibited by adding a small proportion of an inhibitor such as sodium nitrite to the ethyl acrylate:ethyl alcohol:water ternary azeotrope before feeding it into the column 2; when sodium nitrite is used, a concentration of about 0.01% to 0.05% in the ternary mixture is suitable.

In the following examples, which are given to illustrate the present invention, parts by weight shown therein bear the same relation to parts by volume as do kilograms to litres. Percentages are given as percentages by weight.

*Example 1*

A reactor, fitted with a fractionating column having a vapour-splitting automatically controlled reflux dividing head, was charged with 50 parts by weight of concentrated phosphoric acid and 50 parts by weight of a mixture consisting of 73.5% by weight of ethyl 3-ethoxypropionate, 15.4% by weight of ethyl alcohol and 11.1% by weight of water; the mixture thus contained 15.1% by weight of water based on the weight of the 3-ethoxypropionate present.

A stream of nitrogen was passed through the apparatus and the contents of the reactor were heated. Some ethyl acrylate formed, passed into the fractionating column and was distilled over in the form of azeotropes with ethyl alcohol and with water, consisting of 47.6% by weight of ethyl acrylate, 40% by weight of ethyl alcohol and 10% by weight of water and having a boiling point of 78° C. at a reflux ratio of 3:1. When the temperature of the reactor reached 130° C., a mixture of ethyl 3-ethoxypropionate, ethyl alcohol and water, having the same composition as that charged to the reactor, was fed in at the rate of 25 parts by volume per hour. When the temperature of the reactor reached 145° C., the reflux ratio was adjusted so that the rate of removal of the azeotropes, ethyl acrylate with ethyl alcohol and with water, was approximately equal to the feed rate of the ethyl 3-ethoxypropionate:ethyl alcohol:water mixture fed to the reactor, in order to maintain a constant level in the reactor. A small continuous flow of nitric oxide through the apparatus was maintained throughout in order to inhibit polymerisation of ethyl acrylate.

The ethyl acrylate produced was recovered from the mixture of ethyl acrylate, ethyl alcohol and water by using the apparatus shown diagrammatically in the figure.

The yield of ethyl acrylate obtained was 94.2% by weight and the net yield of ethyl alcohol was 96.4% by weight, the yields in each case being based on the weight of the ethyl 3-ethoxypropionate.

*Example 2*

153.5 parts by weight of a mixture consisting of 74.2% by weight of ethyl 3-ethoxypropionate, 14.7% by weight of ethyl alcohol and 11.1% by weight of a 0.3% aqueous solution of sodium nitrite were introduced in to a reactor together with 15 parts by weight of concentrated sulphuric acid; the mixture thus contained 15.0% by weight of water based on the weight of the ethyl 3-ethoxypropionate present. The resulting mixture was maintained at a temperature in the range from 140° to 150° C. and 3,485 parts by weight more of the mixture of ethyl 3-ethoxypropionate, ethyl alcohol and aqueous sodium nitrite solution were added over a period of 52 hours.

The reaction product, consisting of 47.2% by weight of ethyl acrylate, 39.5% by weight of ethyl alcohol and 12.3% by weight of water, together with a small proportion of diethyl ether, was distilled off at such a rate that the amount of material in the reactor remained substantially constant.

The yield of ethyl acrylate obtained was 94% of the theoretical yield based on the ethyl 3-ethoxypropionate reacted, and the recovery of ethyl alcohol was 96% by weight, the remaining 4% being converted to diethyl ether.

As a contrast to the procedure described in Example 2, 185.5 parts by weight of ethyl 3-ethoxypropionate were introduced into a reactor together with 26.0 parts by weight of concentrated sulphuric acid. The resulting mixture was maintained at a temperature in the range from 140° to 150° C. and 106.1 parts by weight more of ethyl 3-ethoxypropionate were added over a period of 3.5 hours.

The reaction product, consisting of ethyl acrylate, ethyl alcohol, water and diethyl ether, was distilled off at such a rate that the amount of material in the reactor remained substantially constant.

Although a good yield of ethyl acrylate was obtained, the amount of diethyl ether produced corresponded to a 38% by weight conversion of the ethyl alcohol liberated during the reaction. Furthermore, under these conditions almost all the sulphuric acid used as dehydration catalyst was converted to undesirable non-acidic compounds.

I claim:

1. A process of producing ethyl acrylate which comprises heating at a temperature from 100–200° C. in the presence of an acidic dehydration catalyst having a dissociation constant substantially in the range of dissociation constants of sulphuric acid, phosphoric acid and p-toluene sulphonic acid, a mixture consisting of 72–75% by weight of ethyl 3-ethoxypropionate, 14–17% by weight of ethyl alcohol, and from 13–16% by weight, based on the weight of ethyl 3-ethoxypropionate present in the mixture, of water, and removing the ethyl acrylate produced in the form of volatile azeotropes with ethyl alcohol and with water.

2. A process of producing ethyl acrylate which comprises heating at a temperature from 100–200° C. in the presence of an acid selected from the group consisting of sulphuric acid, phosphoric acid and p-toluene sulphonic acid, a mixture consisting of 72–75% by weight of ethyl 3-ethoxypropionate, 14–17% by weight of ethyl alcohol, and from 13–16% by weight, based on the weight of ethyl 3-ethoxypropionate present in the mixture, of water, and removing the ethyl acrylate produced in the form of volatile azeotropes with ethyl alcohol and with water.

References Cited in the file of this patent

UNITED STATES PATENTS

| | | |
|---|---|---|
| 1,890,277 | Bauer | Dec. 6, 1932 |
| 2,341,663 | Schulz | Feb. 15, 1944 |
| 2,649,475 | Bellringer et al. | Aug. 18, 1953 |

OTHER REFERENCES

Berkman et al.: "Catalysis," 1940, pp. 735–746.

Horsley: "Azeotropic Data," 1952, pp. 9 and 62.

Fieser: "Experiments in Organic Chemistry," 3d edition, 1955.

Horning: "Organic Syntheses," Coll. vol. 3, 1955, pages 146–148.

Weissberger: "Technique of Organic Chemistry," vol. II, second edition, 1956, page 197.